(12) United States Patent
Marshall

(10) Patent No.: US 8,616,559 B2
(45) Date of Patent: Dec. 31, 2013

(54) KEY FOR QUICK CHANGE FOR TURRET POCKET

(75) Inventor: Harold James Marshall, Forest, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 670 days.

(21) Appl. No.: 12/710,825

(22) Filed: Feb. 23, 2010

(65) Prior Publication Data

US 2010/0213677 A1 Aug. 26, 2010

Related U.S. Application Data

(60) Provisional application No. 61/202,427, filed on Feb. 26, 2009.

(51) Int. Cl.
*B23Q 3/00* (2006.01)
*F16B 5/06* (2006.01)
*F16B 7/04* (2006.01)

(52) U.S. Cl.
USPC .......................... 279/2.11; 403/358; 403/367

(58) Field of Classification Search
USPC .................. 279/2.1, 2.11; 403/358, 367, 368
IPC ............................. B23Q 3/00; F16B 5/06, 7/04
See application file for complete search history.

(56) References Cited

U.S. PATENT DOCUMENTS

| | | | |
|---|---|---|---|
| 1,673,236 A | 6/1928 | Fleisher | |
| 3,378,285 A * | 4/1968 | Staley | 403/358 |
| 3,418,837 A | 12/1968 | Vanderlaan et al. | |
| 3,581,542 A | 6/1971 | Wahler et al. | |
| 3,797,429 A | 3/1974 | Wolfe | |
| 3,971,186 A * | 7/1976 | Havelka et al. | 403/374.4 |
| 3,983,729 A | 10/1976 | Traczyk et al. | |
| 4,278,711 A | 7/1981 | Sullivan | |
| 4,298,904 A * | 11/1981 | Koenig | 361/720 |
| 4,318,157 A * | 3/1982 | Rank et al. | 361/704 |
| 4,402,202 A | 9/1983 | Gombas | |

(Continued)

FOREIGN PATENT DOCUMENTS

DE 37 05 878 A1 9/1987
DE 39 08 394 C1 12/1989

(Continued)

OTHER PUBLICATIONS

American National Can; Drawings showing commercially available 5811-12 necker machine and Parts List; Oct. 1993; 4 pages.

(Continued)

*Primary Examiner* — Eric A Gates
(74) *Attorney, Agent, or Firm* — Nixon Peabody LLP

(57) ABSTRACT

In an embodiment, there is a turret pocket key that includes a first slider block, a second slider block, a third slider block and a fourth slider block. The slider blocks are retained such that the slider blocks are adapted to move relative to one another, the key is adapted to move the first slider block and/or the fourth slider block to draw the first slider block and the fourth slider block relatively towards each other, and when the first slider block and the fourth slider block are drawn relatively towards each other, the second slider block and the third slider block move outward in a direction normal to the relative direction of movement of the first slider block towards the fourth slider block.

13 Claims, 12 Drawing Sheets

(56) References Cited

U.S. PATENT DOCUMENTS

| | | | |
|---|---|---|---|
| 4,446,714 A | | 5/1984 | Cvacho |
| 4,480,287 A * | | 10/1984 | Jensen .......................... 361/707 |
| 4,513,595 A | | 4/1985 | Cvacho |
| 4,519,232 A | | 5/1985 | Traczyk et al. |
| 4,547,645 A | | 10/1985 | Smith |
| 4,671,093 A | | 6/1987 | Dominico et al. |
| 4,697,414 A | | 10/1987 | McCarty |
| 4,774,839 A | | 10/1988 | Caleffi et al. |
| 4,808,053 A | | 2/1989 | Nagai et al. |
| 4,819,713 A * | | 4/1989 | Weisman ...................... 165/80.2 |
| 4,824,303 A * | | 4/1989 | Dinger .......................... 411/79 |
| H906 H * | | 4/1991 | Baggett et al. ............. 403/409.1 |
| 5,010,444 A * | | 4/1991 | Storrow et al. ................ 361/719 |
| 5,209,101 A | | 5/1993 | Finzer |
| 5,220,993 A | | 6/1993 | Scarpa et al. |
| 5,224,016 A * | | 6/1993 | Weisman et al. .............. 361/728 |
| 5,242,497 A | | 9/1993 | Miller et al. |
| 5,249,449 A | | 10/1993 | Lee et al. |
| 5,262,587 A * | | 11/1993 | Moser .......................... 174/15.1 |
| 5,344,252 A * | | 9/1994 | Kakimoto ...................... 403/358 |
| 5,407,297 A * | | 4/1995 | Hulme et al. .............. 403/409.1 |
| 5,485,353 A * | | 1/1996 | Hayes et al. ................... 361/802 |
| 5,497,900 A | | 3/1996 | Caleffi et al. |
| 5,555,756 A | | 9/1996 | Fischer et al. |
| 5,590,558 A | | 1/1997 | Saunders et al. |
| 5,611,231 A | | 3/1997 | Marritt et al. |
| 5,676,006 A | | 10/1997 | Marshall |
| 5,718,030 A | | 2/1998 | Langmack |
| 5,755,130 A | | 5/1998 | Tung et al. |
| 5,771,807 A * | | 6/1998 | Moss .......................... 101/375 |
| 5,832,769 A | | 11/1998 | Schultz |
| 6,220,138 B1 | | 4/2001 | Sakamoto |
| 6,285,564 B1 * | | 9/2001 | O'Brien ........................ 361/801 |
| 6,622,379 B1 | | 9/2003 | Kano |
| 6,637,247 B2 | | 10/2003 | Bowlin |
| 6,874,971 B2 * | | 4/2005 | Albaugh ....................... 403/297 |
| 7,219,790 B2 | | 5/2007 | Lanfranchi |
| 7,263,867 B2 | | 9/2007 | Bartosch et al. |
| 7,310,983 B2 | | 12/2007 | Schill et al. |
| 7,387,007 B2 | | 6/2008 | Schill et al. |
| 7,404,309 B2 | | 7/2008 | Schill et al. |
| 7,409,845 B2 | | 8/2008 | Schill et al. |
| 7,418,852 B2 | | 9/2008 | Schill et al. |
| 7,454,944 B2 | | 11/2008 | Schill et al. |
| 7,464,573 B2 | | 12/2008 | Shortridge |
| 7,483,271 B2 * | | 1/2009 | Miller et al. ................... 361/704 |
| 7,530,445 B2 | | 5/2009 | Marshall et al. |
| 7,568,573 B2 | | 8/2009 | Schill |
| 7,805,970 B2 | | 10/2010 | Woulds |
| 8,045,332 B2 * | | 10/2011 | Lee et al. ...................... 361/759 |
| 2003/0063949 A1 * | | 4/2003 | Hohenocker ................. 403/367 |
| 2006/0101885 A1 | | 5/2006 | Schill et al. |
| 2006/0101889 A1 | | 5/2006 | Schill et al. |
| 2007/0227859 A1 | | 10/2007 | Marshall et al. |
| 2010/0212130 A1 | | 8/2010 | Marshall |
| 2010/0212385 A1 | | 8/2010 | Marshall |
| 2010/0212390 A1 | | 8/2010 | Marshall et al. |
| 2010/0212394 A1 | | 8/2010 | Babbitt et al. |
| 2010/0213030 A1 | | 8/2010 | Green |
| 2011/0108389 A1 | | 5/2011 | Bonnain |

FOREIGN PATENT DOCUMENTS

| | | |
|---|---|---|
| DE | 40 23 771 | 1/1992 |
| DE | 103 19 302 B3 | 8/2004 |
| EP | 0 384 427 A1 | 8/1990 |
| EP | 1 215 430 A1 | 6/2002 |
| EP | 1 714 939 A1 | 10/2006 |
| GB | 0 235 28 | 0/1910 |
| GB | 1 042 506 | 9/1966 |
| JP | 05-038476 A | 2/1993 |
| JP | 2002-310178 | 10/2002 |
| WO | WO-88/05700 A1 | 8/1988 |
| WO | WO-90/11839 | 10/1990 |
| WO | WO-96/33032 | 10/1996 |
| WO | WO-97/37786 | 10/1997 |
| WO | WO-98/19807 A1 | 5/1998 |
| WO | WO-01/90591 A1 | 11/2001 |
| WO | WO-2006/055185 A1 | 5/2006 |
| WO | WO-2010/099067 A1 | 9/2010 |
| WO | WO-2010/099069 A1 | 9/2010 |
| WO | WO-2010/099081 A1 | 9/2010 |
| WO | WO-2010/099082 A1 | 9/2010 |
| WO | WO-2010/099165 A2 | 9/2010 |
| WO | WO-2010/099171 A1 | 9/2010 |

OTHER PUBLICATIONS

American National Can; Extracts from brochure: 5811/5811-2 Necker Flanger Reformer—Periodic Inspection and Maintenance Procedures; Apr. 22, 1994; 9 pages.

American National Can; Extracts from brochure: ANC Necker Secrets Revealed; 1996; 3 pages.

American National Can; Invoice to Hanil Can Co., Ltd dated Feb. 2, 1998; 1 page.

Notice of Opposition mailed May 12, 2010, to European Application No. 05817255.2; Patent No. 1824622.

PCT International Search Report and the Written Opinion on application No. PCT/US2010/025182 dated Sep. 28, 2010; 17 pages.

USPTO Action on U.S. Appl. No. 12/501,135 mailed Nov. 8, 2011; 16 pages.

U.S. Appl. No. 11/581,787, filed Oct. 17, 2006, Marshall.

U.S. Appl. No. 11/692,564, filed Mar. 28, 2007, Marshall.

International Search Report for PCT Application No. PCT/US2010/024926 dated May 27, 2010.

U.S. Appl. No. 11/692,584, filed Mar. 28, 2007, Schill.

International Search Report for PCT Application No. PCT/US2010/024941 dated Jun. 23, 2010.

International Search Report for PCT Application No. PCT/US2010/024988 dated Jun. 14, 2010.

International Search Report for PCT Application No. PCT/US2010/024992 dated Jun. 2, 2010.

International Search Report for PCT Application No. PCT/US2010/025192 dated Jun. 18, 2010.

Partial Search Report for PCT Application No. PCT/US2010/025182 dated Jul. 14, 2010.

* cited by examiner

Surfaces With "X" Are Contact Surfaces In Clamped Position

Surfaces With "X" Are Contact Surfaces In Clamped Position

KEY FOR QUICK CHANGE FOR TURRET POCKET

CROSS-REFERENCE TO RELATED PATENT APPLICATIONS

This application claims priority to Provisional U.S. Patent Application Ser. No. 61/202,427, entitled Article Processing Machine and Machine Arrangement, filed on Feb. 26, 2009, naming Harold Marshall, Dennis Shuey, Terrry Babbitt, Joseph Schill and Dennis Green as inventors, the contents of that application being incorporated herein by reference in its entirety.

BACKGROUND

The teachings herein relate generally to series of machines or machine units which are included in a machine line, and more specifically to apparatus which forms part of the machines and which enables the line to be quickly switched between a first set-up wherein a first sized product is modified/manufactured and at least one other set-up wherein a different sized product is modified/manufactured.

SUMMARY

An embodiment includes machines used to form the neck on containers, including beer and other beverage cans, which provide high speed precision necking that is reliably realized. The present inventors have identified a drawback when switching from a production run of one sized container to another sized container, such as, for example, a run where a can is produced which is 5 inches tall, and another run where a can is produced which is 6 inches tall, in that the downtime tends to be considerable and/or the number of steps and tools required to execute the switching operation is considerable, etc. For example, a change-over may require the switching of an extensive number of elements and replacing them with new elements and/or re-adjusting current elements to accommodate the new length of the next can to be necked.

In an embodiment, there is a turret pocket key that comprises a first slider block, a second slider block, a third slider block and a fourth slider block. The slider blocks are retained such that the slider blocks are adapted to move relative to one another. Movement of the first slider block and/or the fourth slider draws the first slider block and the fourth slider block relatively towards each other, and when the first slider block and the fourth slider block are drawn relatively towards each other, the second slider block and the third slider block move outward in a direction normal to the relative direction of movement of the first slider block towards the fourth slider block.

In an embodiment, there is a turret pocket key as described above and/or below, wherein the key is adapted to move the first slider block and/or the fourth slider block to draw the first slider block and the fourth slider block relatively away from each other, and wherein when the first slider block and the fourth slider block are drawn relatively away from each other, the second slider block and the third slider block are free to move inward in a direction normal to the relative direction of movement of the first slider block away from the fourth slider block.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION OF SOME EMBODIMENTS

According to embodiments of the invention, a turret may be resized to accommodate a can of a different size. Such a resizing or changeover may be done quickly with use of a turret pocket key. A turret pocket key is configured to lock the turret when the turret pocket key is tightened, or to unlock the turret when the turret pocket key is loosened. The turret pocket key locks the turret by expanding in X and Y planes in a keyway to prevent the turret from additional movement. When the turret pocket key is loosened, the turret is unlocked to permit the turret to move axially to changeover to a different size for a differently sized can. The turret pocket key also provides alignment and enables proper positioning of the turret.

Figure 1:
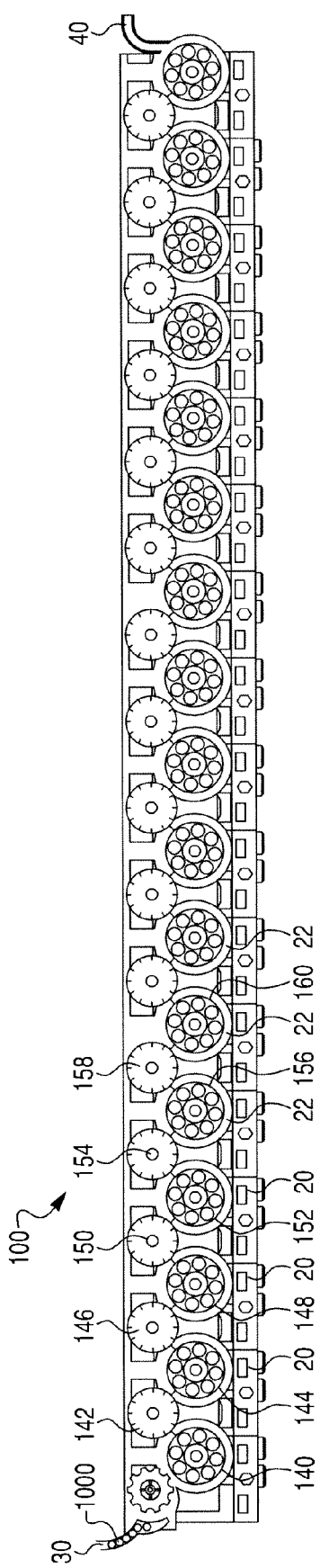
FIG. 1 presents a side view of a machine line according to an embodiment.

In a first embodiment, referring to FIG. 1, there is a machine line 100 which is adapted to neck containers and/or embryonic containers (hereinafter container refers to both containers and embryonic containers), such as, for example and not by way of limitation, cans, as the containers pass through a series of turret necking stations (142, 146, 150, 154, 158) in a serpentine path. As may be seen, the containers 1000 enter the machine line 100 via a can infeed 30 and are "picked up" by a first transfer starwheel 140 from among a plurality of starwheels 22. The containers 1000, which are held in position on this first transfer starwheel 140 using a pneumatic pressure differential or "suction," orbit about the rotational axis of the starwheel so that the containers are transferred about at least a portion of the starwheel 140. In the embodiment depicted in FIG. 1, the containers 1000 passed from the first transfer starwheel 140 to a first processing turret 142 and enter into a first stage of necking on the first necking turret 142.

Figure 2:
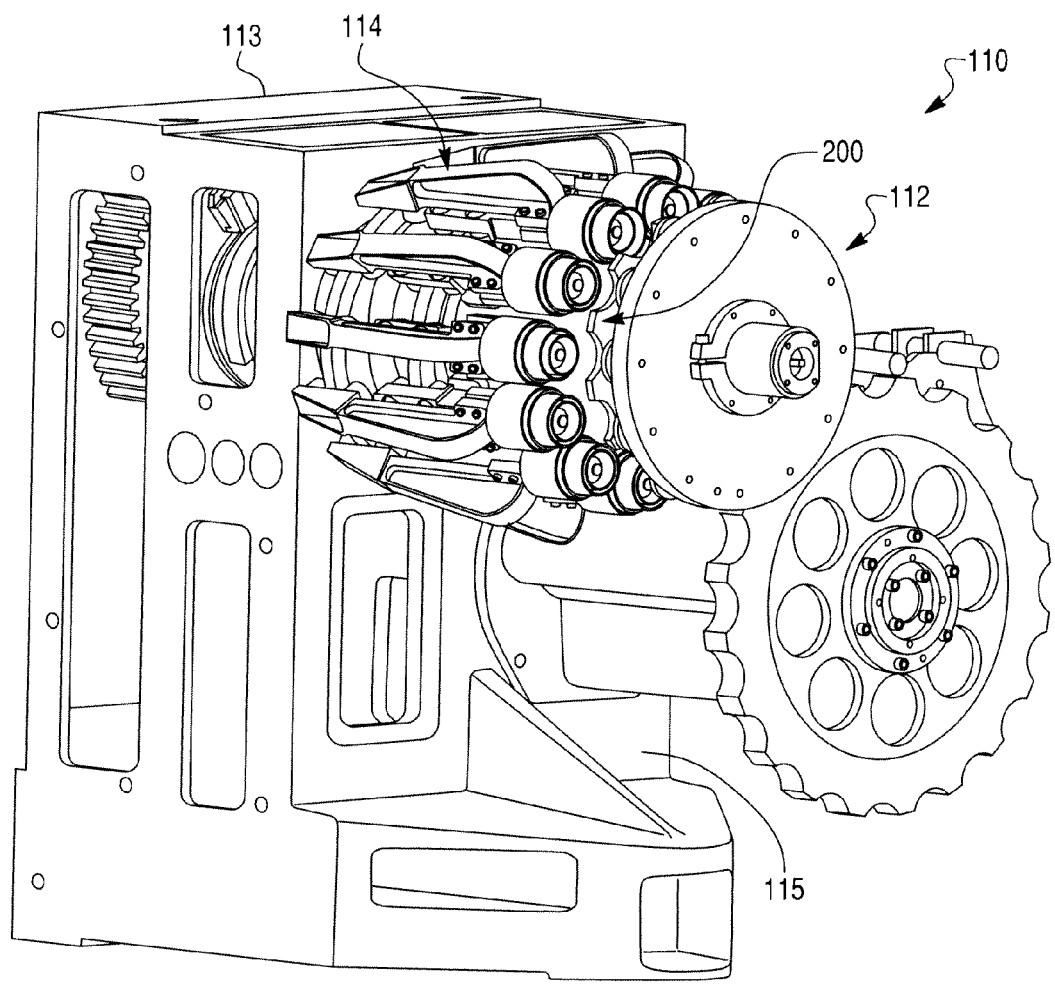
FIG. 2 presents an isometric view of a portion of the machine line of FIG. 1.

It is briefly noted here that while all embodiments are not so limited, some embodiments are such that necking machines 100 are constructed from a series of units 20 which include modules 110. An example of such a module 110 is shown in FIG. 2. The use of necking machine modules 110 allows for the machine line 100 to be assembled/changed to provide as many necking stages as is required and to allow for the addition of additional stages such as flanging and/or base reforming/reprofiling which are carried out following the basic necking operations, to be added/removed as desired. In the embodiment depicted in FIG. 1, the containers travel from the first starwheel 140 to the first processing turret 142 to the second starwheel 144 to the second processing turret 146 to the third starwheel 148 to the third processing turret 150 to the fourth starwheel 152 to the fourth processing turret 154 to the fifth starwheel 156 to the fifth processing turret 158 to the sixth starwheel 160 and so on for as many starwheels and/or turrets are in the necking machine 100, and then onto the exit 40. Modules 110 may be instated into the line 100 to provide the turrets 142, 146, 150, 154 and 158, respectively.

Figure 3:
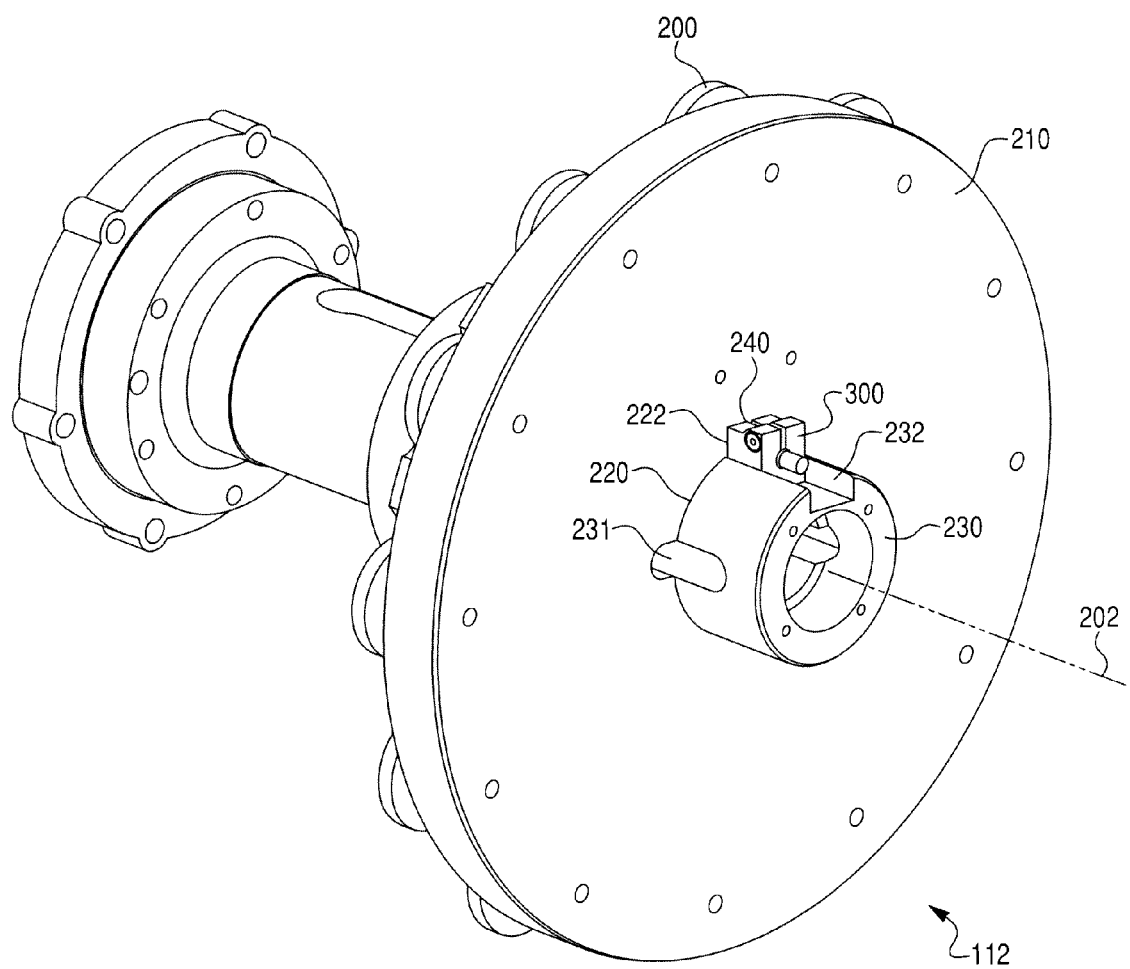
FIG. 3 presents an isometric view of the portion of the machine depicted in FIG. 2.
Figure 4:
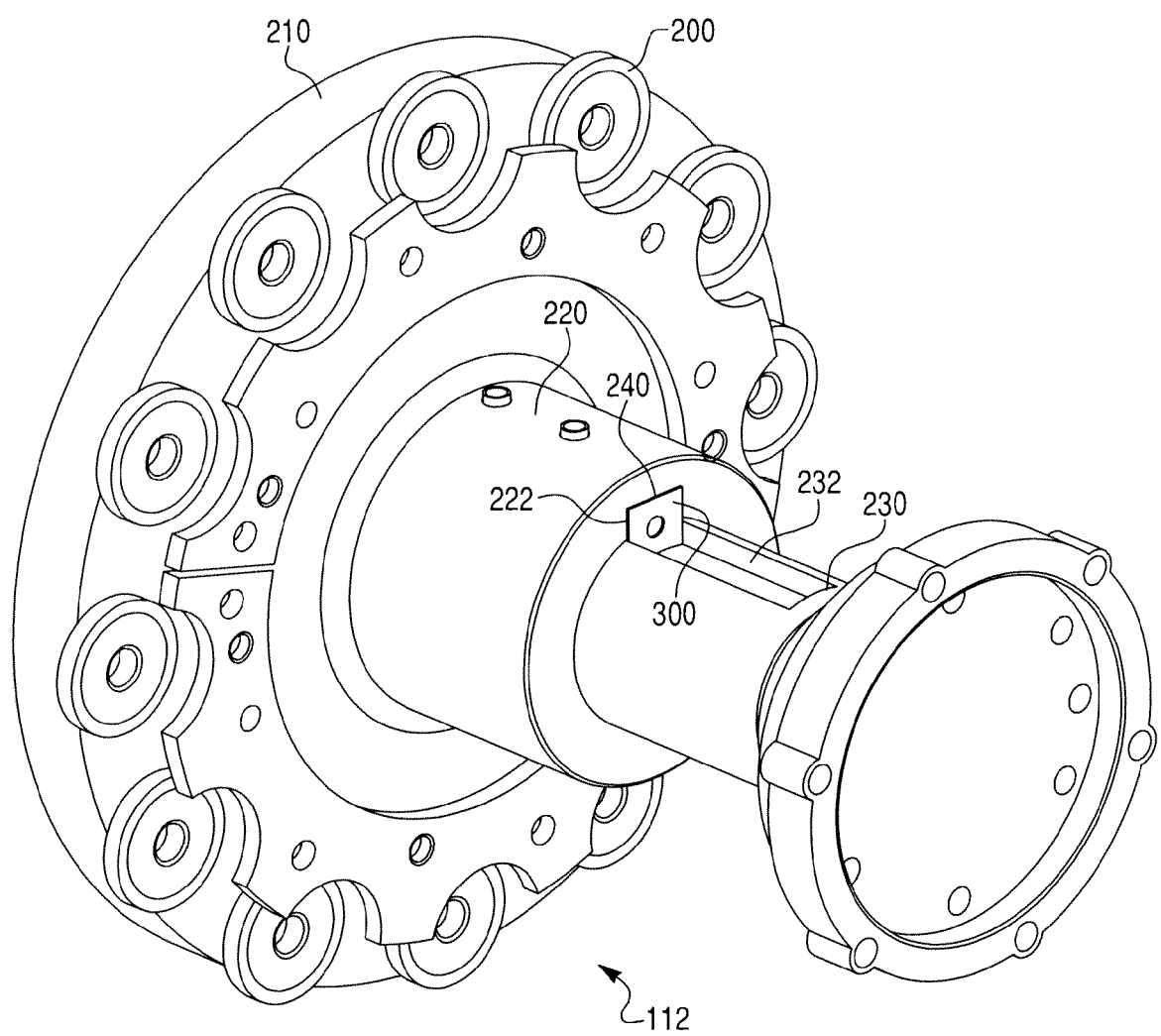
FIG. 4 presents an isometric view of the component depicted in FIG. 3 from another angle.

FIGS. 3 and 4 depict an exemplary embodiment of an outboard turret assembly 112, which is an outboard portion (i.e., on the side of the machine 100 seen in FIG. 1) of a processing turret 142, 146, 150, etc. FIG. 3 depicts an isometric view of the outboard turret assembly 112 when viewed approximately from the same view as FIG. 1, and FIG. 4 depicts an isometric view of the outboard turret assembly 112 when viewed approximately from the other side of the view of FIG. 1. The outboard turret assemblies hold and release (releasably hold) the non-necked portion of the container (e.g., the base) in the turret assemblies using holders 200, which supply a suction (vacuum, etc.) to the base of the containers 1000, as the necked portion of the container is necked by the inboard turret 114. In this regard, the outboard turret 112 may be considered a holder turret and the inboard turret 114 may be considered a necking turret.

In the embodiment depicted in FIG. 2, the outboard turret assemblies 112 are movable turrets in that the turrets move along the axial direction of rotation 202 (see FIG. 3) of the turrets. The outboard turret assemblies 112 are located distally from an end housing 113 of the module 110, and are supported on the base frame or chassis 115 of the respective turret modules 110 so as to be axially movable toward and away from the respective inboard turret assemblies 114. This allows the outboard turret assemblies 112 to be repositioned with respect to the respective inboard turret assemblies 114 so that the distance between the respective outboard turret assemblies 112 and inboard turret assemblies 114 may be adjusted to allow for a change in the length/height of the containers to be necked. By way of example only and not by way of limitation, this movement eliminates the need to modify/replace push plates that would otherwise be necessary in order to allow for the difference in container length.

Referring to FIGS. 3 and 4, the outboard turret assemblies 112 comprise a turret 210 including a hub 220 and a shaft 230. The outboard turret assemblies 112 are adapted to releasably hold one or more containers and/or embryonic containers 1000 and to rotate the one or more containers and/or embryonic containers 1000 about a rotation axis 202 of the outboard turret assembly 112 when the one or more containers and/or embryonic containers 1000 are held by the outboard turret assembly 112.

The turret 210, including the hub 220, is adapted to slide along the shaft 230 in the axial direction 202 of the shaft (i.e., towards and away from the respective inboard turret assembly 114) to accommodate containers/embryonic containers 1000 of different heights/lengths. In this regard, in the embodiment depicted in FIGS. 3 and 4, the turret 210, including the hub 220, is provided with a bore dimensioned to form a slip fit or a slightly larger fit with respect to the shaft 230. For example, a clearance may be provided of about 0.001 to 0.003 inches. Any other suitable clearance amount from zero and greater may be provided.

In the embodiment depicted in FIGS. 3 and 4, a turret pocket key 300 is utilized to lock/clamp the turret 210 to the shaft 230 in the axial direction 202 of the shaft 230 so that the turret 210 will not move along the shaft 230. The turret pocket key 300 is configured to be adjusted to permit the turret 210 to be respectively locked/clamped to the shaft 230 and unlocked/unclamped from the shaft 230 so that the respective outboard turret assemblies 112 (movable turret assemblies) may be repositioned with respect to the respective inboard turret assemblies 114 so that the distance between the respective outboard turret assemblies 112 and inboard turret assemblies 114 may be adjusted to allow for a change in the length of the containers to be necked.

In the embodiment depicted in FIGS. 3 and 4, the turret 210 includes a keyway 222 in the hub 220, while, opposite the keyway 222, the shaft 230 includes a keyway 232 in the shaft. Collectively, the hub keyway 222 and the shaft keyway 232 form a turret pocket 240 in which the turret pocket key 300 is located.

It is noted that in some embodiments as described above and/or below, the position of the turret 210 may be adjusted, with respect to the axis 202, to adjust for different size containers, without removing the turret 210 from the shaft 230. That is, the turret 210 may be supported against the pull of gravity by the shaft 230 while still being permitted to slide along the shaft 230 and/or, in some embodiments, rotate relative to the shaft assembly. The turret 210 cannot significantly rotate about shaft 230 because of the position of the key 300.

In an exemplary embodiment, the turret pocket key 300 may be adjusted to laterally expand and contract (e.g., slider blocks 310 and 340 move downward while slider blocks 320 and 330 move upward and to the left and right, respectively, and visa-versa—more on this below) so as to positionally (i.e., rotation about and movement along axis 202) lock/clamp the turret 210 to the shaft 230.

Figure 12:
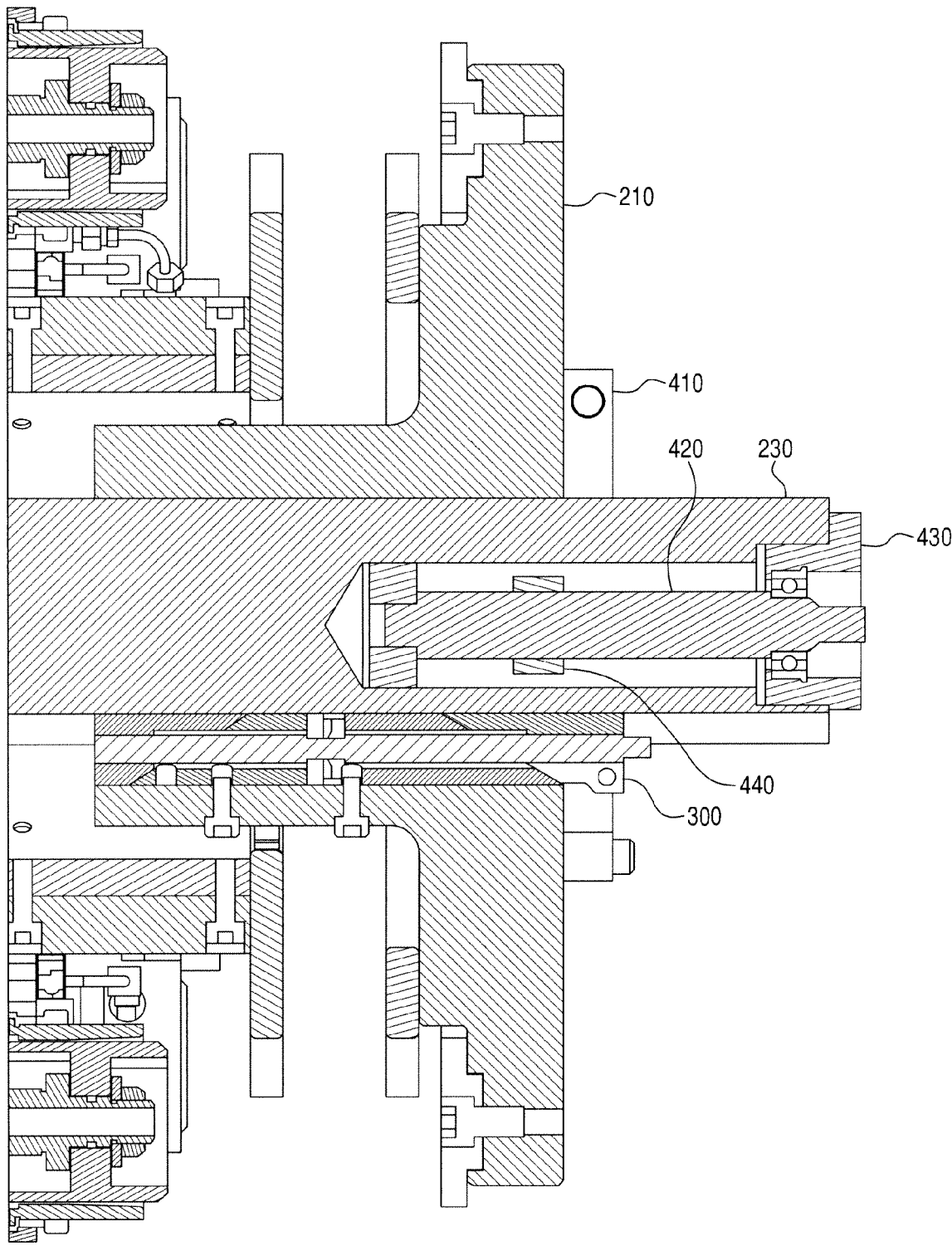
FIG. 12 presents a sectional view of a portion of a turret assembly.
Figure 13:
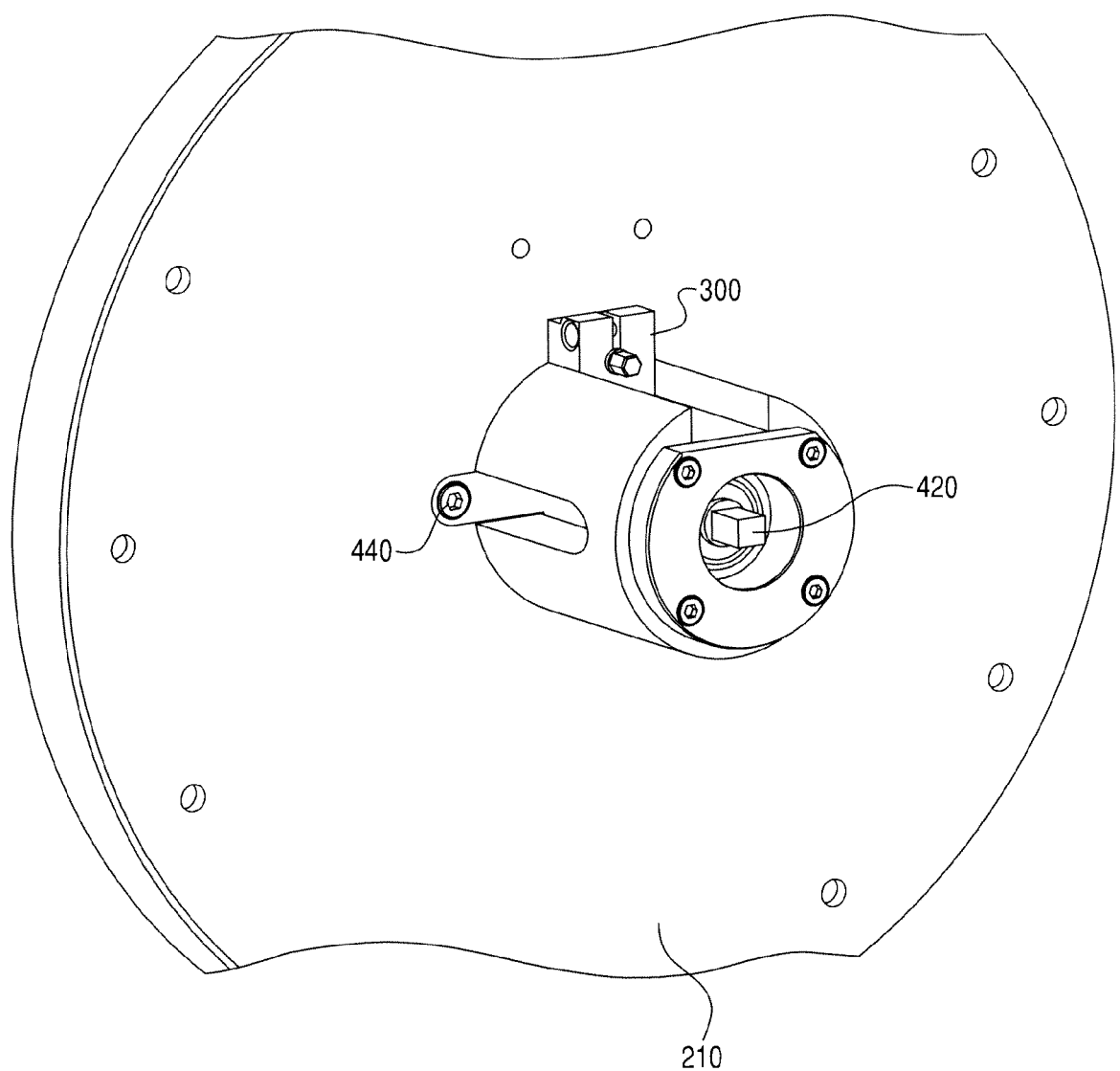
FIG. 13 presents an isometric view of the portion of the machine depicted in FIG. 12 without showing a can plate clamp.
Figure 14:
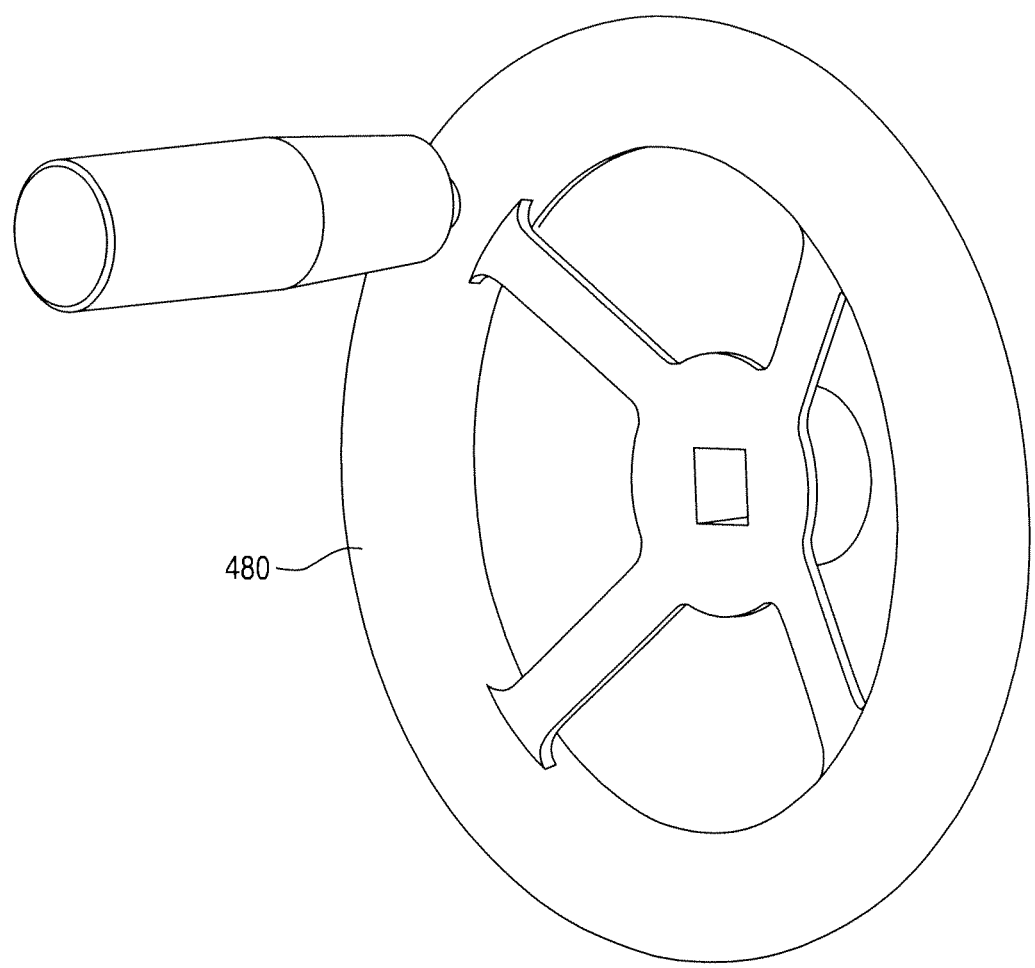
FIG. 14 presents an isometric view of a hand crank according to an embodiment.

In order to adjust the turret assembly 112 to accommodate a can height of a different size, a can plate clamp 410 and the key 300 are loosened. The can plate clamp 410, such as shown in FIG. 12, surrounds the shaft 230. In order to loosen the can plate clamp 410, a can plate adjusting nut 440 (FIG. 13) is loosened. The shaft 230 includes a clearance slot 230 (FIG. 3) to allow for access to the adjusting nut 440. A hand crank, such as the hand crank 480 shown in FIG. 14, is then inserted onto an end of a can height adjusting screw 420. The can height adjusting screw 420, such as shown in FIGS. 12 and 13, extends from approximately a center portion of the shaft 230 and a bearing housing 430.

After the hand crank 480 is coupled to the can height adjusting screw 420, the hand crank 480 is turned, such as by an operator, to rotate the turret 210 and move the turret 210 forward or backward to position the turret 210 to the desired location to accommodate a differently sized can. After the appropriate adjustment is made, the hand crank 480 is removed and the can plate clamp 410 and key 300 are tightened to lock the turret 210 into position.

More specific details of some embodiments of the pocket key 300 will now be detailed.

Figure 5:
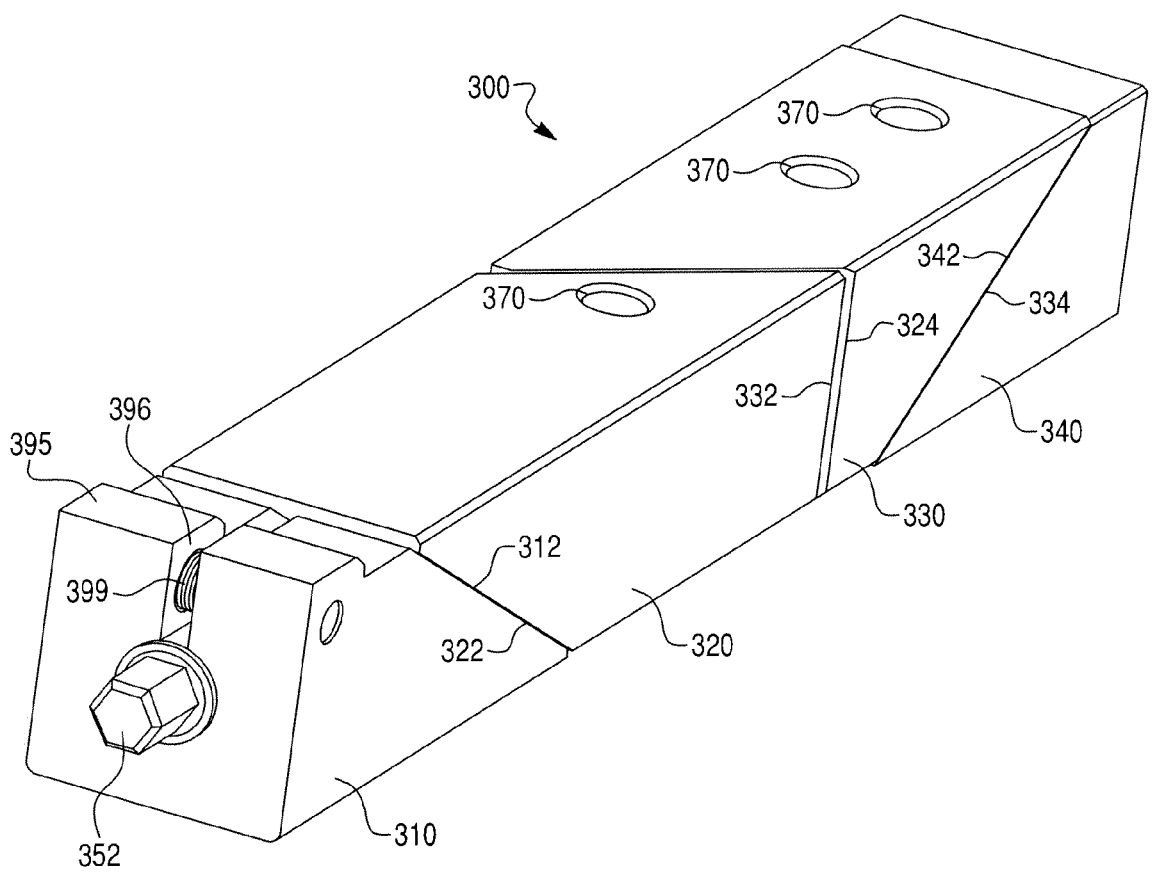
FIG. 5 presents an isometric view of a key according to an embodiment.
Figure 6:
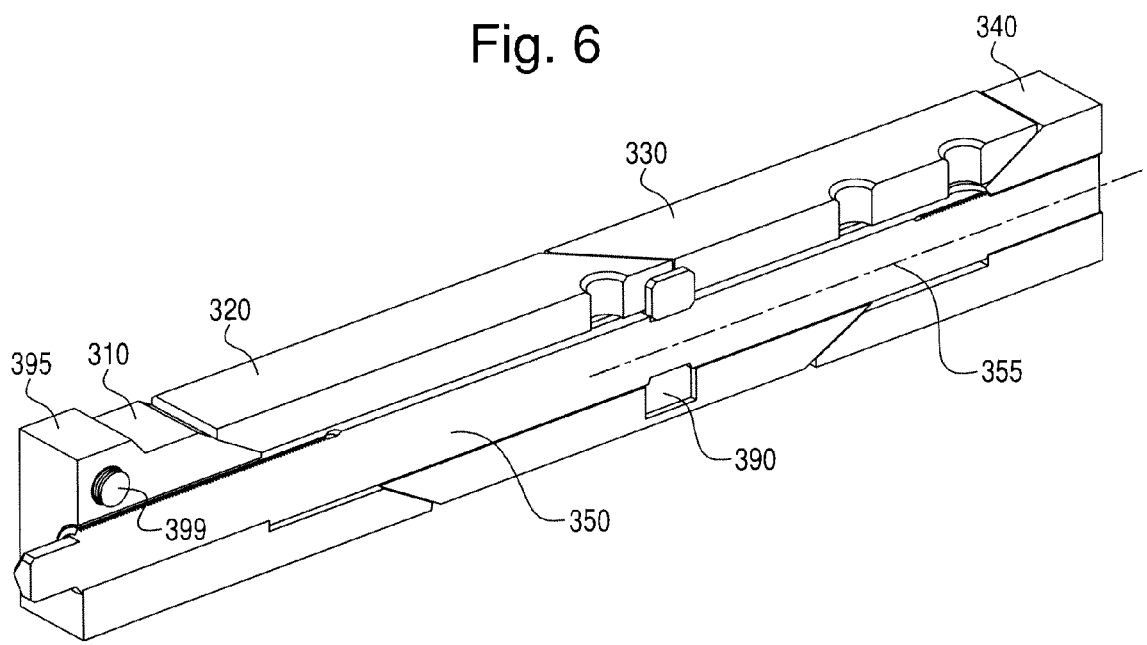
FIG. 6 presents a cross-sectional view of the key of FIG. 5.

In an embodiment referring by way of example to FIGS. 5 and 6 (FIG. 6 depicting a cross-sectional view of the key 300 of FIG. 5), the turret pocket key 300 comprises a first slider block 310 which is in the form of a wedge as may be seen, a second slider block (wedge) 320, a third slider block (wedge) 330, and a fourth slider block (wedge 340), wherein the slider blocks are retained by a jackscrew device 350 (more on this below) such that the slider blocks are adapted to move relative to one another. In an embodiment, key 300 is adapted to move the first slider block and/or the fourth slider block to draw the first slider block 310 and the fourth slider block 340 relatively towards each other. By relatively towards each other, it is meant that the distance between the two decreases, whether by movement of the first slider block 310 alone, movement of the fourth slider block 340 alone and/or movement of the first 310 and forth 340 slider block together. When the first slider block 310 and the fourth slider block 340 are drawn relatively towards each other, the second slider block 320 and the third slider block 330 move outward in a direction normal to the relative direction of movement of the first slider block 310 towards the fourth slider block 340.

In an embodiment, movement of the second slider block 320 and the third slider block 330 outward in a direction normal to the relative direction of movement of the first slider block 310 towards the fourth slider block 340 includes movement of the second slider block 320 and movement of the third slider block 330 away from the longitudinal axis 355 of jackscrew device 350. In an embodiment, when the first slider block 310 and the fourth slider block 340 are relatively drawn towards each other, with respect to a plane normal to the relative direction of movement of the first slider block 310 towards the fourth slider block 340 (e.g., normal to the axis 355), the second slider block 320 relatively moves (i) outward away from the relative direction of movement of the first slider block 310 towards the fourth slider block 340 in a first direction, and (ii) outward away from the relative direction of movement of the first slider block 310 towards the fourth slider block 340 in a second direction, and the third slider block 330 relatively moves (iii) outward away from the relative direction of movement of the first slider block 310 towards the fourth slider block 340 in the first direction, and (iv) outward away from the relative direction of movement of the first slider block 310 towards the fourth slider block 340 in a third direction that is different from the second direction. In the embodiment depicted in the figures, the third direction is opposite the second direction, and the first direction is normal to the second direction.

Figure 7:
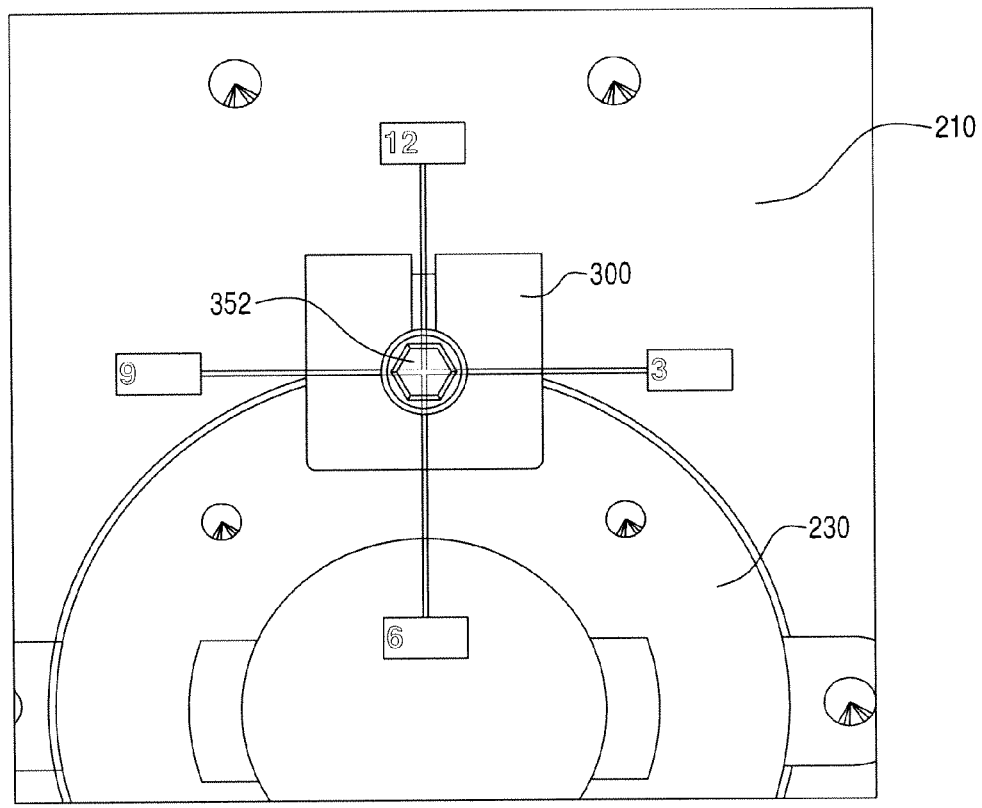
FIG. 7 presents a window view of the key installed in the pocket formed by a hub and a shaft.

Referring to FIG. 7, which presents a window view of the turret 210 looking from the outboard side into the inboard side down the axis 202, where the end of the key 300 may be seen, and where directions have been labeled according to a face of a clock (12 O'clock position, 3 O'clock position, 6 O'clock position, 9 O'clock position). When the first slider block 310 moves relatively towards the fourth slider block 340, the second slider block 320 moves in a direction having a vector having components in the 12 O'clock direction (the first direction) and the 3 O'clock direction (the second direction) (i.e., it moves upward and to the right in the view of FIG. 7), and the third slider block 330 moves in a direction having a vector having components in the 12 O'clock direction (the first direction) and the 9 O'clock direction (the third direction) (i.e., it moves upward and to the left in the view of FIG. 7). The slider blocks are so moved in these directions to place the key 300 in the laterally expanded state.

In an embodiment, the key 300 is adapted to move the first slider block 310 and/or the fourth slider block 340 to draw the first slider block 310 and the fourth slider block 340 relatively away from each other (relatively away from each other includes movement of any one or both of those blocks such that the result is that the first slider block 310 and the fourth slider block 340 are further away from each other). In this embodiment, when the first slider block 310 and the fourth slider block 310 are drawn relatively away from each other, the second slider block 320 and the third slider block 330 are free to move inward in a direction normal to the relative direction of movement of the first slider block away from the fourth slider block. Referring to FIG. 7, when the first slider block 310 moves relatively away from the fourth slider block 340, the second slider block 320 moves in a direction having a vector having components in the 6 O'clock direction and the 9 O'clock direction (i.e., it moves downward and to the left in the view of FIG. 7), and the third slider block 330 moves in a direction having a vector having components in the 6 O'clock direction and the 3 O'clock direction (i.e., it moves downward and to the right in the view of FIG. 7). The slider blocks are so moved in these directions to place the key 300 in the laterally retracted state.

In some embodiments, some and/or all of the slider blocks move in different directions than those just detailed. Any direction of movement is acceptable as long as the slider blocks move in directions that permit the present invention to be practiced.

In another embodiment the key 350 includes a bearing collar 390 as may be seen in FIG. 6. The bearing collar 390 is encapsulated in between slider block 320 and slider block 330. The bearing collar 390 promotes separation when the key assembly 300 is loosened and can, in some embodiments, also assist to align slider blocks 320 and 330 with each other and/or with jack screw 350.

Referring to FIGS. 5 and 6 the key 300 includes lug 395 which extends upward from slider block 310. Lug 395 is bifurcated, as is the entire upper portion of slider block 310 at space 396. A bolt 399 extends through a threaded bore which spans through lug 395. In the embodiment depicted in the Figs., the bolt 399 may be turned to impart a compressive force on the sides of lug 395. That is, the bolt 399 may be turned to clamp jack screw 350 once the key assembly 300 is clamped to the required position on the hub 220 of the shaft 230.

An exemplary scenario entailing preparing the machine line 100 to neck containers will now be described.

A technician manually and/or automatically slides a turret sub-assembly including turret 210 with hub 220 and turret pocket key 300, which is attached to the turret 210, along shaft 230 when the shaft 230 is interposed inside the hub 220. The technician slides the turret sub-assembly to a desired location along the longitudinal direction (i.e., in the direction of the axis 202) of the shaft 230 that corresponds to a position suitable for the height/length of the containers to be necked. The technician manually and/or automatically adjusts the turret pocket key 300 from a laterally retracted state to a laterally expanded state to clamp the turret 210 with the hub 220 to the shaft 230 in the axial direction of the shaft 230 to prevent the turret 210 with the hub 210 from sliding along the shaft 230 in the axial direction of the shaft.

The technician obtains a ratchet socket wrench or the like and places the ratchet socket wrench on the head 352 of the jack screw 350. The technician ratchets the jack screw head 352 in a clockwise direction or a counterclockwise direction, as appropriate (depending on the direction of the threads of the jack screw) so that the key 300 expands in the lateral direction to the laterally expanded state. The technician then removes the ratchet wrench from the head 352 of the jack screw 350. In this scenario, as the technician ratchets the jack screw 350 to laterally expand the key 300, slider block 310 (relative to the coordinate system depicted in FIG. 7) moves downward, along with slider block 340 of the key 300, and slider blocks 320 and 330 move upwards, all relative to one another. This has the effect of lifting the turret 210 with the hub 220 upward such that the friction force between the shaft 230 and the hub 220 and the key 300 increases to the point where a substantial force may be applied to the turret 210 in the longitudinal direction of the shaft 230 and the turret 210 will substantially not move along the shaft 230 such that the position of the turret 210 along the shaft 230 is maintained.

Geometries of the slider blocks of the key 300 may take various forms. In an embodiment, the first slider block 310 includes, as referred to by reference numbers in FIG. 5 directed towards the edge of the recited faces (the recited faces being eclipsed by the figures), a first face 312 that bisects, at an oblique angle, the relative direction of movement of the first slider block 310 towards the fourth slider block 340. The second slider block 320 includes a second face 322 that bisects, at an oblique angle, the relative direction of movement of the first slider block 310 towards the fourth slider block 340. The second slider block 320 includes a third face 324 that bisects, at an oblique angle, the relative direction of movement of the first slider block 310 towards the fourth slider block 340. The third slider block 330 includes a fourth face 332 that bisects, at an oblique angle, the relative direction of movement of the first slider block towards the fourth slider block, and the third slider block includes a fifth face 334 that bisects, at an oblique angle, the relative direction of movement of the first slider block towards the fourth slider block. The fourth slider block 340 includes a sixth face 342 that bisects, at an oblique angle, the relative direction of movement of the first slider block 310 towards the fourth slider block 340. In the exemplary embodiment depicted in the Figs., the first face 312 is opposite the second face 322 and parallel to the second face 322, the third face 324 is opposite the fourth face 332 and parallel to the fourth face 332; and the fifth face 334 is opposite the sixth face 342 and parallel to the sixth face 342.

In some embodiments, the slider blocks are not in the form of wedges as depicted in the Figs. Other shapes may be utilized, as long as those shapes permit a key 300 to be utilized in accordance with the present invention. Further, in some embodiments, a scissor jack device may be utilized instead of wedges. In this regard, an embodiment exists where a first foot of the scissor jack reacts against the keyway 232 in the shaft 230, and a second foot of the scissor jack reacts against the keyway 222 in the hub 220 of the turret 210. As the scissor jack device is extended, the feet move relative to one another (upward and downward with respect to the geometries depicted in FIG. 7), lifting the hub 220 up from the shaft 230 until a sufficient friction force develops between the hub 220 and the shaft 230 and the feet of the scissor jack device to clamp/secure the turret 210 in the lateral axial direction of the shaft 230.

In an embodiment, such as that depicted in the Figs., when the first slider block 310 and the fourth slider block 340 are drawn towards each other, the first face 312 slides along the second face 322 and/or visa-versa such that at least one of the first slider block 310 and the second slider block 320 are relatively moved in directions normal (i.e., at an angle 90 degrees from) to the relative direction of movement of the first slider 310 towards the fourth slider block 340 away from each other. In an embodiment, the third face 324 slides long the fourth face 332 and/or visa-versa such that the second slider block 320 and the third slider block 330 are relatively moved in directions normal to the relative direction of movement of the first slider block 310 towards the fourth slider block 340, away from each other. In an embodiment, the fifth face 334 slides along the sixth face 342 and/or visa-versa such that the third slider block 330 and the fourth slider block 340 are relatively moved in directions normal to the relative direction of movement of the first slider block towards the fourth slider block away from each other. In an embodiment, the first face 312 slides along the second face 322 and/or visa-versa and the fifth face 334 slides along the sixth face 342 and/or visa-versa such that the second slider 320 block and the third slider block 330 are relatively moved, with respect to the first slider block 310 and the fourth slider block 340, in a direction normal to the relative direction of movement of the first slider block 310 towards the fourth slider block 340.

In an embodiment, such as that depicted in the Figs., when the first slider block 310 and the fourth slider block 340 are drawn towards each other, the first face 312 slides along the second face 322 and/or visa-versa such that at least one of the first slider block 310 and the second slider block 320 are relatively moved in normal directions (i.e., directly away from each other) normal to the relative direction of movement of the first slider 310 towards the fourth slider 340. In an embodiment, the third face 324 slides long the fourth face 332 and/or visa-versa such that the second slider block 320 and the third slider block 330 are relatively moved in normal directions normal to the relative direction of movement of the first slider block 310 towards the fourth slider block 340. In an embodiment, the fifth face 334 slides along the sixth face 342 and/or visa-versa such that the third slider block 330 and the fourth slider block 340 are relatively moved in normal directions normal to the relative direction of movement of the first slider block towards the fourth slider block. In an embodiment, the first face 312 slides along the second face 322 and/or visa-versa and the fifth face 334 slides along the sixth face 342 and/or visa-versa such that the second slider block 320 and the third slider block 330 are relatively moved, with respect to the first slider block 310 and the fourth slider block 340, in a same direction that is normal to the relative direction of movement of the first slider block 310 towards the fourth slider block 340.

As noted above, in an embodiment, the slider blocks are retained by a jackscrew device 350. In an embodiment as depicted in the Figs., the jackscrew 350 extends through the first slider block 310, the second slider block 320, the third slider block 330 and the fourth slider block 340 in the direction of movement of the first slider block 310 and/or the fourth slider bock 340 relatively towards each other. In some embodiments, the slider blocks may be retained by any type of key tensioner 350 adapted to draw the first slider block 310 and/or the fourth slider bock 340 relatively towards each other and adapted to draw the first slider block 310 and/or the fourth slider block 340 relatively away from each other.

In an embodiment, the key tensioner 350 is part of a jackscrew mechanism that includes a first threaded slider block driver mechanism, which in some embodiments is the first slider block 310, and in other embodiments is a separate block linked to the first slider block 310 and/or in pushing interface with the first slider block 310, that moves along a first lateral direction of the jackscrew 350 as the jackscrew 350 is rotated in a first rotation direction to draw the first slider block 310 and/or the fourth slider block 340 relatively towards each other, and moves along a second lateral direction of the jackscrew 350 opposite the first lateral direction as the jackscrew 350 is rotated in a second direction opposite the first rotation direction to draw the first slider block 310 and/or the fourth slider block 340 relatively away from each other. In an embodiment, the first threaded slider block driver mechanism is integral to the first slider block and/or the fourth slider block, as depicted in the Figs.

Referring to FIG. 7, presenting a view of the turret looking from the outboard side into the inboard side, the end of the key 300 may be seen, along with the hexagonal wrench lug 352 adapted to receive a wrench (socket or otherwise) to permit a technician turn the jackscrew 350 to laterally expand/contract the key 300.

In an embodiment, the jackscrew mechanism includes a second threaded slider block drive mechanism, (although in some embodiments only one slider block drive mechanism is threaded, the opposite having a thrust bearing or the like to accept the rotation of the jack screw 350 and react against a pulling and/or pushing force of the jack screw 350), which in some embodiments is the fourth slider block 340 (as is the case of the embodiment depicted in the Figs.) and in other embodiments is a separate block linked to the fourth slider block 340 and/or in pushing interface with the fourth slider block 340. The first threaded slider block mechanism is adapted to draw the first slider block 310 in a first lateral direction of the jackscrew relatively towards the fourth slider block 340 as the jackscrew 350 is rotated in a first rotation direction, and the second threaded slider block mechanism is adapted to draw the fourth slider block 340 in a second lateral direction of the jackscrew 350 opposite the first lateral direction relatively towards the first slider block 310 as the jackscrew is rotated in the first rotation direction. In an embodiment, the first threaded slider block mechanism is adapted to draw the first slider block in the second lateral direction of the jackscrew relatively away from the fourth slider block as the jackscrew is rotated in a second rotation direction, and the second threaded slider block mechanism is adapted to draw the fourth slider block in the first lateral direction of the jackscrew relatively away from the first slider block as the jackscrew is rotated in the second rotation direction.

FIG. 6 presents a cross-section of the key 300 taken on a first plane that is (i) parallel to and (ii) lies on a direction of movement of the first slider block 310 and the fourth slider block 340 relatively towards each other (e.g., lies on axis 355). As may be seen in FIG. 6, an extrapolated exterior profile of the first slider block that lies on the first plane is in the general form of a right-angled trapezoid. By extrapolated exterior profile in the general form of, it is meant a profile that would be analogous to that present in the actual device. By way of example, the protrusion 395 from the first slider block 310 would not be included in an extrapolated exterior profile of the first slider block, while the bore through which the jackscrew 350 extends would also not be included. Further describing the embodiment depicted in FIG. 6 according to the standard just detailed for identifying the recited geometric shapes, an extrapolated exterior profile of the second slider block 320 that is in the general form of a right-angled trapezoid lies on the first plane, an extrapolated exterior profile of the third slider block 330 that is in the general form of a right-angled trapezoid lies on the first plane, and an extrapolated exterior profile of the fourth slider block 340 that is in the general form of a right-angled trapezoid also lies on the first plane.

Figure 8:
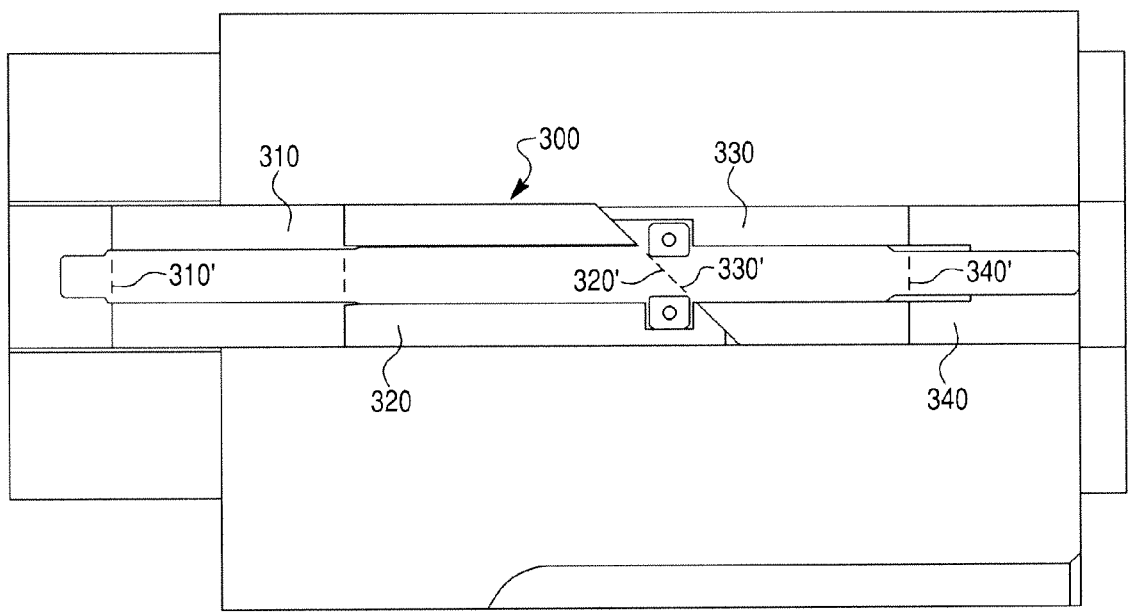
FIG. 8 presents a cross-sectional view of the key installed in the pocket formed by the hub and the shaft of FIG. 7.

FIG. 8 depicts a cross-section of the key 300 taken on a second plane that is (i) parallel to, (ii) lies on a direction of movement of the first slider block 310 and the fourth slider block 340 relatively towards each other and (iii) is normal to the first plane just discussed. As may be seen, an extrapolated exterior profile of the first slider block 310 that lies on the second plane is in the general form of a rectangle 310' (by the standard detailed above for identifying these geometric shapes on the first plane). FIG. 8 further depicts that, according to the standards detailed above detailed for identifying the recited geometric shapes, an extrapolated exterior profile of the second slider block 320 on the second plane is in the general form of a right-angled trapezoid 320', an extrapolated exterior profile of the third slider block 330 on the second plane is in the general form of a right-angled trapezoid 330', and an extrapolated exterior profile of the fourth slider block 340 on the second plane is in the general form of a rectangle 340'.

In an embodiment, the general forms of the right-angled trapezoids of the second slider block 320 and the third slider block 330 on the first plane have the angled surfaces of those two right-angled trapezoids substantially parallel to one another, and the general forms of the right-angled trapezoids of the second slider block 320 and the third slider block 330 on the second plane have the angled surfaces of those two right-angled trapezoids substantially parallel to one another, as may be seen in the Figs.

Some exemplary embodiments where a key, such by way of example only and not by limitation, the key 300 described herein, is utilized will now be described.

In an embodiment a turret assembly 200 of the machine line 100 includes the shaft 230, the turret 210 (which includes the hub 220), wherein the shaft 230 is interposed inside the hub 220. The turret assembly 200 includes a turret pocket key 300, such as described herein, adapted to be adjusted from a laterally retracted state to a laterally expanded state and visa-versa. In the turret assembly 200, the shaft 230 includes a first keyway 232, the hub 220 of the turret 210 includes a second keyway 222. The second keyway 232, once aligned with the first keyway 222, forms a pocket 240, as may be seen in FIGS. 3 and 4, in which key 300 may be positioned. In the embodiments depicted in the Figs., the key grooves have lateral room to allow the elements of the key 300 to move laterally.

In the embodiment depicted in FIGS. 3 and 4, and as detailed above, the turret 210, including the hub 220, is adapted to slide along the shaft 230 in the axial direction of the shaft 230 (i.e., in the direction of axis 202) when the key 300 is in the laterally retracted state. Further, the turret 210 is clamped to the shaft 230 in the axial direction of the shaft when the key 300 is in the laterally expanded state to prevent the turret 210 from sliding along the shaft 230 in the axial direction of the shaft 230.

Figure 10:
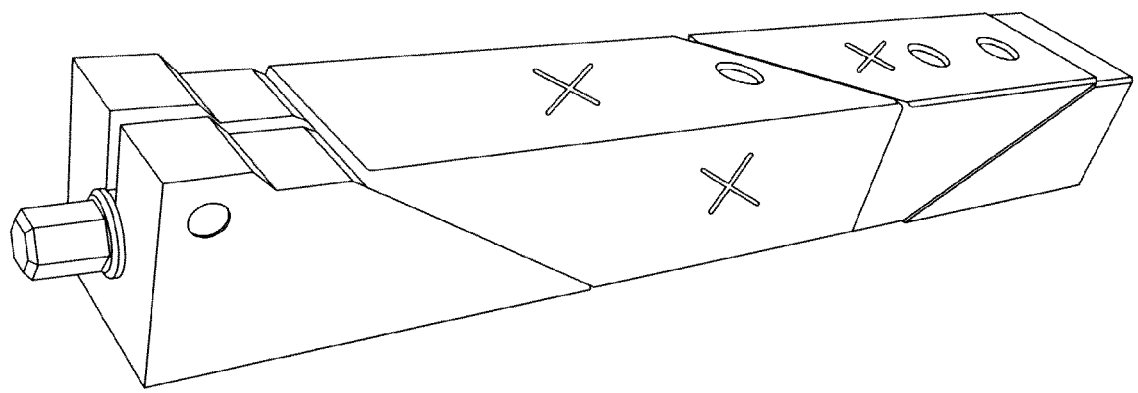
FIGS. 10 and 11 present isometric views depicting contact surfaces of the key.
Figure 11:
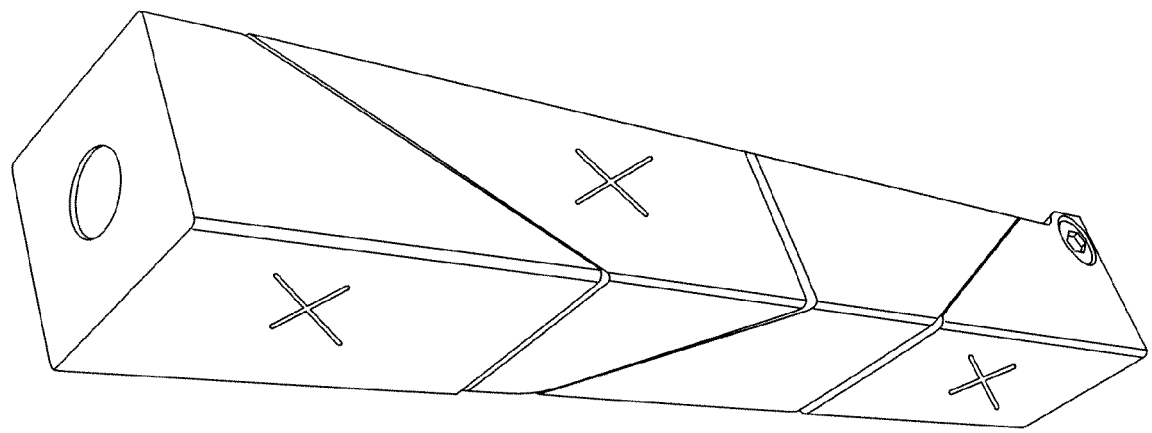

FIGS. 10 and 11 present views of the key 300 depicting contact surfaces of the key 300 with the turret pocket 240 when the key 300 is in the laterally expanded state. The surfaces marked with an "X" indicate contact surfaces when the turret 210 is clamped to the shaft 230. In the embedment depicted in the Figs., second sliding block 320 contacts the interior of pocket 240 at the 12 and 3 O'clock positions (with regard to the coordinates of FIG. 7), third slider block 330 contacts the interior of the pocket 240 at the 12 and 9 O'clock positions (again with regard to the coordinates of FIG. 7), first slider block 310 contacts the interior of the pocket 240 at the 6 O'clock position, as does fourth slider block 340, to result in clamping/locking of the turret 210 to the shaft 230. Of course, in other embodiments, the surfaces could be different, depending on the configuration of the key elements. In this regard, any configuration of the key may be used providing that the fundamental principles of clamping as disclosed herein may be obtained.

In an embodiment, the lateral expansion of the key 300 provides a clamping/locking force. The key 300 is adapted to provide an expansion force in the radial direction (i.e., in a direction normal to the axis 355 depicted in FIG. 6), with respect to the longitudinal axis of the shaft 230 (in the direction of axis 202), when the key 300 is in the laterally expanded state. The expansion force in the radial direction when the key 300 is in the laterally expanded state reacts against the first keyway 232 of the shaft 300 and/or the second keyway 222 of the turret 210 such that friction force between (i) the first keyway 232 of the shaft 230 and the respective opposite surface or surfaces of the key 300 and/or (ii) the second keyway 222 and the respective opposite surface or surfaces of the key 300 is sufficient to prevent the turret 210 from sliding along the shaft 230 when a force generated by the processing tooling (primarily can necking) is applied to the turret in the axial direction of the shaft 230.

In some embodiments, when the key 300 is in the retracted state, various slider blocks no longer contact the various grooves and/or even if there is contact between some or all of the slider blocks with some or all of the various grooves, the friction force between (i) the first keyway 232 of the shaft 230 and the respective opposite surface or surfaces of the key 300 and/or (ii) the second keyway 222 and the respective opposite surface or surfaces of the key 300 is not sufficient to prevent the turret 210 from sliding along the shaft 230 when a given force is applied to the turret in the axial direction of the shaft 230, thus permitting the turret 210 to move along the shaft 230. In an embodiment, the machine assembly is adapted such that the key 300 is adjusted from the laterally retracted state to the laterally expanded state to achieve the friction force sufficient to clamp/lock the turret 210 to the shaft 230 without moving the turret 210 with respect to the axial direction of the shaft 230. Alternatively, the shaft 230 may not move more than, for example, 0.001 to 0.003 inches (or any other suitable range).

In an embodiment, the key 300 is adapted to provide an expansion force in the tangential direction with respect to the circumference of the shaft 230, when the key 300 is in the laterally expanded state. The expansion force in the tangential direction when the key 300 is in the laterally expanded state reacts against the first keyway 232 and the second keyway 222 such that the turret 210 including the hub 220 is highly rotationally aligned with the shaft 230 to permit necking operations to be performed and effectively does not move relative to the shaft 230.

Figure 9:
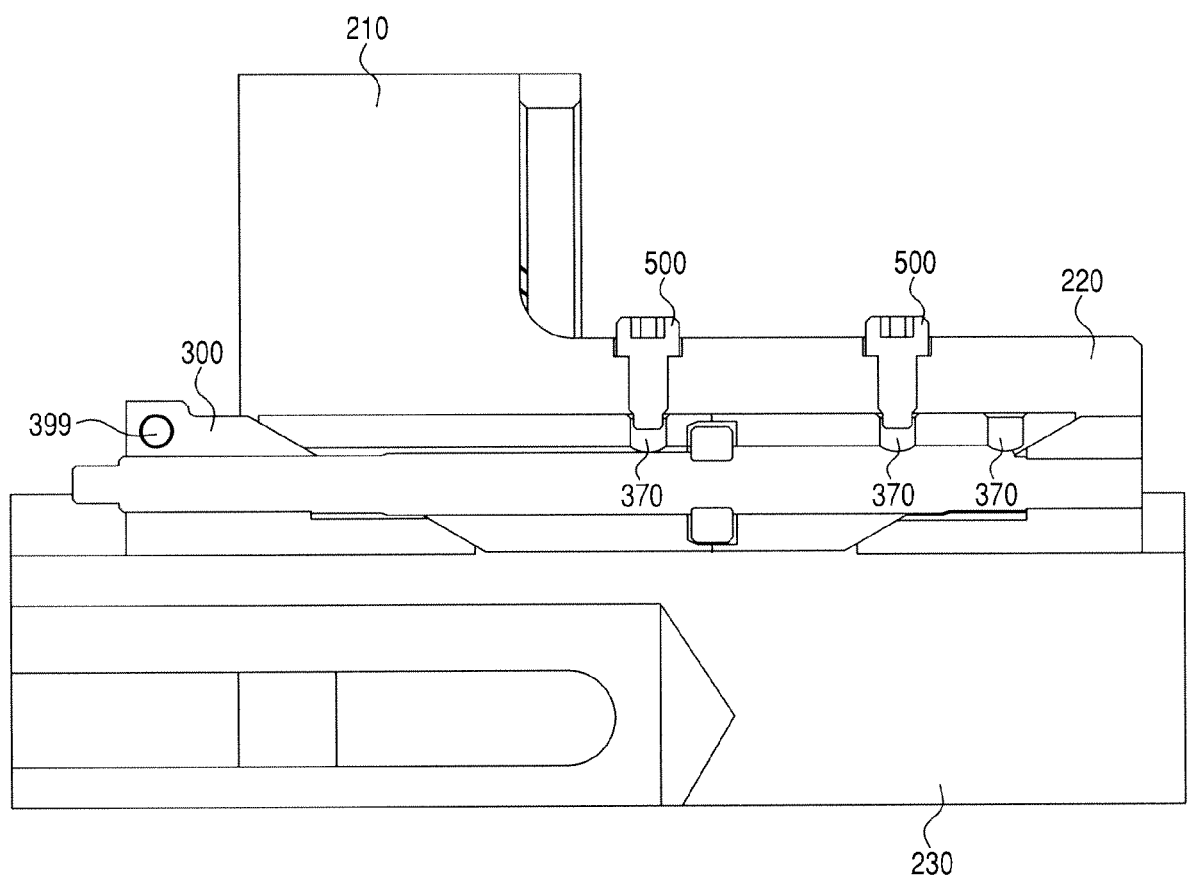
FIG. 9 presents a cross-sectional view of the key installed in the pocket formed by the hub and the shaft of FIG. 7.

FIG. 9 depicts a cross-sectional view of the key 300 in the pocket 240 taken on a plane on the rotation axis of the turret 230 (axis 202) and through an axis of rotation of the jack-screw 350 (axis 355). As may be seen, bolts 500 extend through hub 220 into bores 370 in the key 300 such that the key 300 is held with the hub 220 as the turret 210 with the hub 220 is moved along the shaft 230. There is sufficient play in the bores 370 of the key 300 to permit the clamping and de-clamping operations described herein to take place. For example, in some embodiments, the bolts 500 are of a smaller diameter than the diameter of the bores 370, permitting the respective blocks to move in the direction of the channels and move laterally with respect to the channels. As may be seen in the Figs., in an exemplary embodiment, the key 300 includes three bore holes while the hub 220 only includes two bolts. Additional holes and/or bolts are provided as necessary in order to facilitate movement of the turret 210 along the shaft in a convenient manner for the technician.

Referring back to the exemplary scenario detailed above, as the technician ratchets the jack screw 350 such that slider block 320 moves to the right (with respect to the coordinate system depicted in FIG. 7) and slider block 330 moves to the left, relative to one another, the slider block 320 and/or the slider block 330 comes into contact with corresponding surfaces of the keyway 232 in the key and/or corresponding surfaces of the keyway 222 in the hub 220 (depending on the tolerances and alignment, it is possible for the sides of the slider blocks 320 and/or 330 to only contact the keyway 222, only contact the keyway 232 and/or only contact one side of the keyway 222 and the other side of the keyway 232). In this regard, once the slider blocks 320 and 330 are moved to the left and right, the turret 210 is highly rotationally aligned with the shaft 230, such that any possible rotation that might be present between the turret 210 relative to the shaft 230 is substantially reduced. In an embodiment, the movement of slider blocks 320 and 330 upward relative to slider blocks 310 and 340 to move the corresponding turret 210 and hub 220 upward with the slider blocks 320 and 330 with respect to shaft 230 is sufficient to highly rotationally align the turret assembly 210 with the shaft 230. It will be noted that in some embodiments, the jack screw 350 may be rotated automatically. That is, a technician need not apply a ratchet to the jack screw head 352, but a device utilizing, such as, for example, a rotational solenoid, may be attached to the jack screw head 352, which imparts a rotational torque to the jack screw 350 sufficient to laterally expand and laterally retract the key 300. In the same vein, some embodiments are configured to automatically move the turret 210 along the shaft 230 to position the turret 210 at the desired location for the type of containers that are to be necked.

In some embodiments, the key 300 and the corresponding grooves are not located at the 12 O'clock position, but instead are located at the 6 O'clock position, relative to the shaft 230. In some embodiments, the key 300 and the corresponding grooves may be located anywhere about the shaft 230 to permit the present invention to be practiced. Indeed, in some embodiments, two or more keys with corresponding grooves may be used.

As the technician slides the turret 210 along the shaft 230, the key moves along the shaft 210 in the pocket 240 as the turret 210 moves along the shaft 230, due to the bolts 500, which have ends inserted into the bores 370 of the key 300. In this regard, the key 300 is dragged along the pocket 240 with the turret 210.

In another exemplary scenario of utilizing the machine line 100, a technician seeking to adjust the location of the turret 210 with respect to the longitudinal axis of rotation of the shaft 230 approaches the turret 210 and, utilizing a ratchet wrench or other type of wrench, rotates lug 352 to turn the jack screw 350 in the appropriate direction to move slider block 310 away from slider block 340, relatively speaking. As this occurs, slider block 320 and slider block 330 move downward (with respect to the coordinate of FIG. 7) and slider blocks 310 and 340 move upward, relative to one another. This has the effect of moving the turret 210 downward, with the slider blocks 320 and 330, with respect to the shaft 230, thus reducing the friction forces present between the hub 220 and the shaft 230 and the key 300 to a lower value which permits the technician to move the turret 210 along the shaft 230. Again, this may be done manually and/or automatically, and/or in a combination of the two.

The technician moves the turret 210 along the shaft to the desired position and the process is repeated as detailed above.

In an embodiment, the action of adjusting the turret pocket key includes providing an expansion force in the radial direction, with respect to the longitudinal axis of the shaft, such that the provided expansion force in the radial direction after the key has been adjusted reacts against at least one of the hub and the shaft such that a friction force between (i) the hub and the respective opposite surface or surfaces of the key and/or (ii) the shaft and the respective opposite surface or surfaces of the key is sufficient to prevent the turret including the hub from sliding along the shaft when a force equal to the weight of the turret is applied in the axial direction of the shaft.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A turret pocket key, comprising: a first slider block; a second slider block; a third slider block; and a fourth slider block; configured so that the slider blocks are retained such that the slider blocks are adapted to move relative to one another, configured so that the first slider block and/or the fourth slider block is moved to draw the first slider block and the fourth slider block relatively towards each other along an axis, and configured so that, when the first slider block and the fourth slider block are drawn relatively towards each other, the second slider block and the third slider block move outward in a direction normal to the relative direction of movement of the first slider block towards the fourth slider block, wherein the first slider block, the second slider block, the third slider block, and the fourth slider block are disposed at respective positions defined on the axis, the first slider block being disposed at a first location defined on the axis, the second slider block being disposed at a second location defined on the axis, the third slider block being disposed at a third location defined on the axis, the fourth slider block being disposed at a fourth location defined on the axis, the second slider block being disposed at the second position between the first slider block at the first position and the third slider block at the third position, and the third slider block being disposed at the third position between the second slider block at the second position and the fourth slider block at the fourth position, wherein when the first slider block and the fourth slider block are relatively drawn towards each other, with respect to a plane normal to the relative direction of movement of the first slider block towards the fourth slider block: the second slider block relatively moves (i) outward away from the relative direction of movement of the first slider block towards the fourth slider block in a first direction, and (ii) outward away from the relative direction of movement of the first slider block towards the fourth slider block in a second direction, and the third slider block relatively moves (iv) outward away from the relative direction of movement of the first slider block towards the fourth slider block in the first direction, and (iv) outward away from the relative direction of movement of the first slider block towards the fourth slider block in a third direction that is different from the second direction.

2. The turret pocket key of claim 1, the key being adapted to move the first slider block and/or the fourth slider block to draw the first slider block and the fourth slider block relatively away from each other, and when the first slider block and the fourth slider block are drawn relatively away from each other, the second slider block and the third slider block are free to move inward in a direction normal to the relative direction of movement of the first slider block away from the fourth slider block.

3. The turret pocket key of claim 1, the third direction being opposite the second direction.

4. The turret pocket key of claim 1, the first direction being normal to the second direction.

5. The turret pocket key of claim 1, configured so that:
the first slider block includes a first face that bisects, at an oblique angle, the relative direction of movement of the first slider block towards the fourth slider block;
the second slider block includes a second face that bisects, at an oblique angle, the relative direction of movement of the first slider block towards the fourth slider block;
the second slider block includes a third face that bisects, at an oblique angle, the relative direction of movement of the first slider block towards the fourth slider block;
the third slider block includes a fourth face that bisects, at an oblique angle, the relative direction of movement of the first slider block towards the fourth slider block;
the third slider block includes a fifth face that bisects, at an oblique angle, the relative direction of movement of the first slider block towards the fourth slider block; and
the fourth slider block includes a sixth face that bisects, at an oblique angle, the relative direction of movement of the first slider block towards the fourth slider block.

6. The turret pocket key of claim 5, configured so that:
the first face is opposite the second face and parallel to the second face;
the third face is opposite the fourth face and parallel to the fourth face; and
the fifth face is opposite the sixth face and parallel to the sixth face.

7. The turret pocket key of claim 5, configured so that: when the first slider block and the fourth slider block are drawn towards each other, at least one of:
i. the first face slides along the second face and/or visa-versa such that at least one of the first slider block or the second slider block are relatively moved in directions normal to the relative direction of movement of the first slider block towards the fourth slider block, away from each other;
ii. the third face slides long the fourth face and/or visa-versa such that the second slider block and the third slider block are relatively moved in directions normal to the relative direction of movement of the first slider block towards the fourth slider block, away from each other;
iii. the fifth face slides along the sixth face and/or visa-versa such that the third slider block and the fourth slider block are relatively moved in directions normal to the relative direction of movement of the first slider block towards the fourth slider block, away from each other; or
iv. the first face slides along the second face and/or visa-versa and the fifth face slides along the sixth face and/or visa-versa such that the second slider block and the third slider block are relatively moved, with respect to the first slider block and the fourth slider block, in a direction normal to the relative direction of movement of the first slider block towards the fourth slider block.

8. The turret pocket key of claim 7, configured so that the relative movement of the third slider block and the fourth slider block away from each other occurs in directions normal to each other.

9. The turret pocket key of claim 1, configured so that the slider blocks are retained by a key tensioner adapted to draw the first slider block and/or the fourth slider bock relatively towards each other and adapted to draw the first slider block and/or the fourth slider block relatively away from each other.

10. The turret pocket key of claim 9, configured so that the key tensioner is a jackscrew mechanism, wherein the first slider block is configured to:

move along a first lateral direction of the jackscrew as the jackscrew is rotated in a first rotation direction to draw the first slider block and the fourth slider block relatively towards each other; and move along a second lateral direction of the jackscrew opposite the first lateral direction as the jackscrew is rotated in a second direction opposite the first rotation direction to draw the first slider block and the fourth slider block relatively away from each other.

11. The turret pocket key of claim 9, configured so that the key tensioner is a jackscrew mechanism, wherein the fourth slider block is configured to:

move along a first lateral direction of the jackscrew as the jackscrew is rotated in a first rotation direction to draw the first slider block and the fourth slider block relatively towards each other; and move along a second lateral direction of the jackscrew opposite the first lateral direction as the jackscrew is rotated in a second direction opposite the first rotation direction to draw the first slider block and the fourth slider block relatively away from each other.

12. The turret pocket key of claim 9, configured so that the key tensioner is a jackscrew that extends through the first slider block, the second slider block, the third slider block and the fourth slider block in the direction of movement of the first slider block and/or the fourth slider bock relatively towards each other.

13. The turret pocket key of claim 1, wherein one or more of the slider blocks has a cross-sectional shape of a trapezoid, and wherein the cross-section is taken of the key on a first plane that is (i) parallel to and (ii) lies on a direction of movement of the first slider block and the fourth slider block relatively towards each other.

* * * * *